United States Patent [19]

Eickmann

[11] Patent Number: 4,793,239

[45] Date of Patent: Dec. 27, 1988

[54] AXIAL PISTON MOTOR OR PUMP WITH AN ARRANGEMENT TO THRUST THE ROTOR AGAINST A BEARING OF THE SHAFT

[76] Inventor: Karl Eickmann, 2420 Isshiki, Hayama-machi, Kanagawa-ken, Japan

[21] Appl. No.: 41,961

[22] Filed: Apr. 24, 1987

Related U.S. Application Data

[63] Continuation-in-part of Ser. No. 678,540, Dec. 5, 1984, Pat. No. 4,664,018, which is a continuation-in-part of Ser. No. 387,567, Jun. 11, 1982, abandoned, and a continuation-in-part of Ser. No. 521,874, Aug. 10, 1983, abandoned, and a continuation of Ser. No. 954,555, Oct. 25, 1978, Pat. No. 4,358,078, and a continuation of Ser. No. 122,914, Feb. 19, 1980, abandoned, and a continuation of Ser. No. 224,769, Jan. 13, 1981, abandoned, and a continuation of Ser. No. 282,990, Jul. 14, 1981, Pat. No. 4,557,347.

[51] Int. Cl.⁴ ............................................. F01B 13/04
[52] U.S. Cl. ...................................... 91/485; 91/486; 92/57
[58] Field of Search ............................... 91/484–487, 91/507; 92/57

[56] References Cited

U.S. PATENT DOCUMENTS

| | | | |
|---|---|---|---|
| 1,817,063 | 8/1931 | Carrie et al. ................... | 91/487 X |
| 2,299,234 | 10/1942 | Snader et al. ................... | 92/57 X |
| 3,253,551 | 5/1966 | Thoma ............................ | 91/485 |
| 3,479,963 | 11/1969 | Randa et al. ................... | 91/485 |
| 3,808,950 | 5/1974 | Davies ............................ | 91/487 |

FOREIGN PATENT DOCUMENTS

| | | | |
|---|---|---|---|
| 1258162 | 2/1961 | France ............................ | 92/57 |
| 236828 | 7/1945 | Switzerland .................... | 91/507 |

*Primary Examiner*—Paul F. Neils

[57] ABSTRACT

In an axial piston motor or pump the cylinder barrel is mounted on a medial shaft which has a shoulder which axially bears against the front end of the rotor barrel. The rear end of the medial shaft is radially borne in a housing portion. The front portion of the medial shaft is provided with a bearing member of an axial thrust bearing for support on a respective axial thrust bearing member in the housing. On the rear end of the rotary barrel an axially selfthrusting control body is provided to seal the flow of fluid to and from the cylinders of the rotary barrel. The control body presses against the rotary barrel, the rotary barrel presses against the bearing of the medial shaft and the thrust bearing member of the shaft bears on the thrust bearing member of the housing. As a result thereof the cylinders in the rotary barrel can be straight through bores. The manufacturing of the rotor barrel is thereby simplified and the flow acceleration losses of former sack-bare bore type cylinders are prevented.

8 Claims, 5 Drawing Sheets

AXIAL PISTON MOTOR OR PUMP WITH AN ARRANGEMENT TO THRUST THE ROTOR AGAINST A BEARING OF THE SHAFT

REFERENCE TO RELATED APPLICATIONS:

This is a continuation in part application of my application Ser. No. 06-678,540; filed on Dec. 5, 1984; now U.S. Pat. No. 4,664,018; issued on May 12, 1987. The mentioned application Ser. No. 678,540 was filed as a continuation in part application of my earlier patent applications Ser. Nos. 387,567 filed on June 11, 1982; now abandoned, and Ser. No. 521,874 filed on Aug. 10, 1983; now abandoned. Ser. No. 387,567 was a continuation application of my earlier applications 05-954,555, now U.S. Pat. No. 4,358,078, issued on Nov. 9, 1982; 06-122,914; now abandoned, 06-224,769; now abandoned, and 282,990; now U.S. Pat. No. 4,557,347; issued on Dec. 10, 1985; and which were filed on 10/25/1978; 02/19/1980; 01/13/1981 and 07/14/1981 respectively. Serial No. 521,874 is a continuation application of my still earlier patent application serial number 06-064,248 which was filed on 8/06/1979 and which is now abandoned. Benefits of the mentioned patent applications are claimed herewith for the present patent application.

Figure 1:
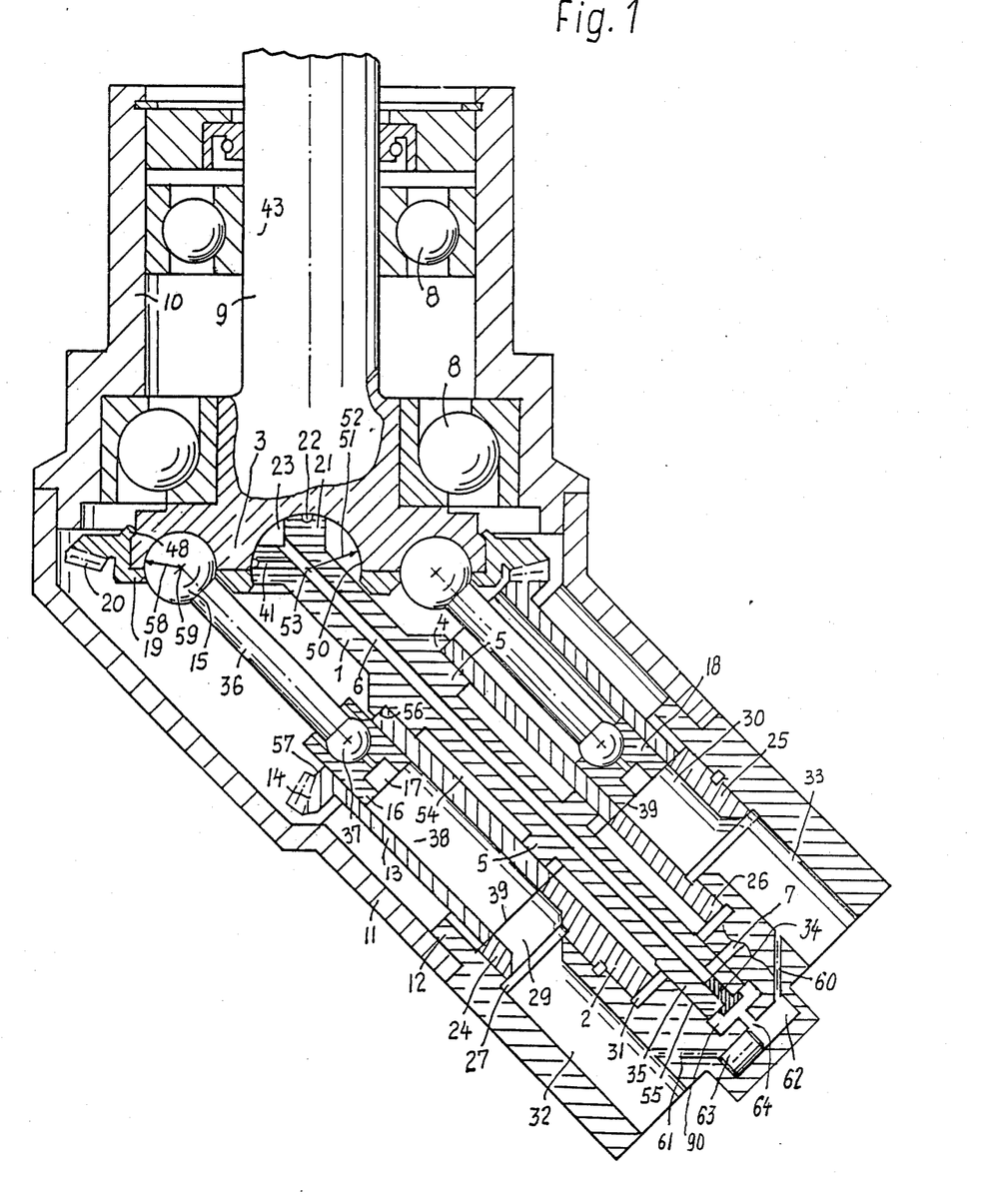
FIG. 1 is a longitudinal sectional view through an embodiment of a motor or pump of the invention.
Figure 2:
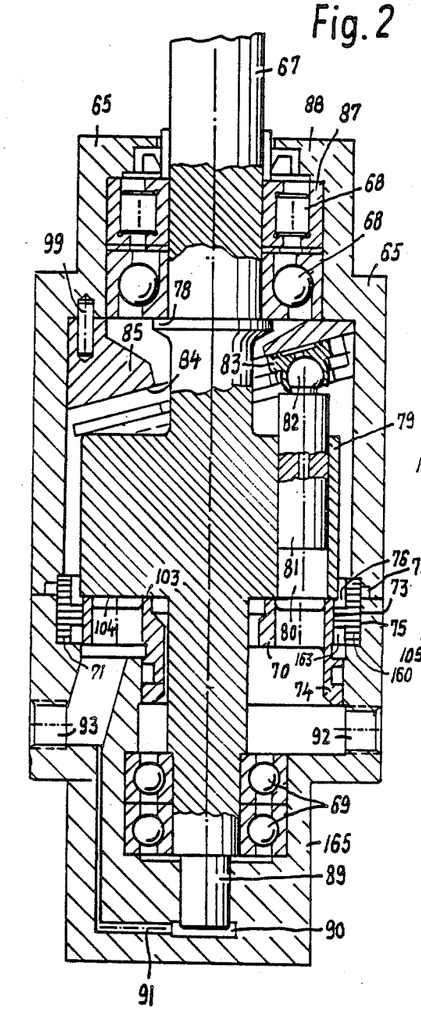
FIG. 2 is a longitudinal sectional view through a further embodiment of the invention.

FIG. 2 is the most simple construction of the invented motor or pump and is a simplification of FIG. 1. The parental application No. 06-678,540 was co-pending at the filing of the present application. FIGS. 2 to 9 are new Figures of this present application,

BACKGROUND OF THE INVENTION

Axial piston pumps and motors have successfully operated in great numbers. Commonly they have cylinders with ported ends, wherein the ported ends are of lesser diameter than the diameters of the cylinders are. The machining of the cylinders thereby requires a relatively difficult and costly work, because the cylinders can not be machined straight through the rotor. The cylinder ports of narrower diameter in addition require an increase of speed of fluid when the fluid flows into and out of the cylinders. That in turn causes friction and reduces the efficiency of the machine.

The common axial piston pumps and motors have intermediate rods between the pistons and the disc. The rods commonly have part-ball formed ends. The pistonward ends are commonly borne in a respective part-ball formed hollow bed in the piston and fastened into the bed in the pistons, so, that the ends of the rods cannot escape from the bed of the pistons. That makes it possible to retract the pistons in a suction stroke in a pump by the rods. However, when a piston sticks in the cylinder the device breaks, because the rod can not move away from the piston. The common axial piston devices as far as here described are therefore to a certain extent dangerous in operation, especially, when life depends on their reliability as for example in aircraft applications.

In common axial piston fluid handling devices those part-ball formed ends of the intermediate rods, which are communicated to the disc are borne in part-ball formed hollow beds in the disc, which is inclined relatively to the axis of the rotor which contains the cylinders. The rear portions of the part-ball formed ends of the intermediate rods, which are borne in the beds of the disc are commonly held by a holding ring with part-ball formed holding beds. The holding ring is fastened to the disc and the mentioned part-ball formed beds of the holding ring are fitting closely around the respective portions of the respective ends of the intermediate rods. This common system works very satisfactory in operation, however the accurate centering of the holding beds onto the respective portions of the ends of the intermediate rods is very delicate and difficult in machining.

THE AIMS AND OBJECTS OF THE INVENTION:

The first object of the invention is, to provide a rotor with straight through cylinders of equal diameter from cylinder end to cylinder end in combination with a suitable control body for the control of flow of fluid into and out of the rotor.

The second object of the invention is, to prevent or to reduce friction in the flow of fluid at the entrance and exit into and from the cylinders of the device in combination with a suitable control body for the sealing and control of flow of fluid into and out of the rotor.

The third object of the invention is, to provide a medial shaft to center and support the rotor of the device.

The fourth object of the invention is, to provide a bearing of the medial shaft on one end thereof and on another end-portion thereof and to do so with little or reduced friction and leakage.

The fifth object of the invention is to provide a shoulder on the medial shaft to bear against the rotor axially.

The sixth object of the invention is to fix the rotor axially between the shoulder of the medial shaft and the control body on the other end of the rotor.

The seventh object of the invention is, to hold the rear portions of the ends of the intermediate rods, which are borne in the disc by a ring with a tapered holding face in order to prevent the difficult, delicate and expensive machining of individual part-ball formed seats on the holding ring.

The eighth object of the invention is, to prevent a fastening of the intermediate rods in the beds of the pistons in order to prevent a disturbance of the device, when a piston sticks;

and the ninth object of the invention is, to guide the piston-most ends of the intermediate rods on the walls of the cylinder when a piston has stuck.

Other aims and objects of the invention may become apparent from the drawing and the description thereof. One of those additional objects is to insert flow-through restriction devices of others of my patents or patent applications into the pistons in order to assure that the pistons are at at all times prssed onto the respective ends of the intermediate rods by high pressure in fluid on the bottoms of the pistons.

DESCRIPTION OF THE PREFERRED EMBODIMENTS

FIG. 1 illustrates an axial piston motor or pump has a rotor with pistons reciprocating in its cylinders. Intermediate rods are connected to a relatively inclined rotary drive flange and are borne in or on ends of the pistons for transfer of force between the pistons and the drive flange. The barrel is connected to or integral with a shaft. The rotor or barrel may be guided and be borne by a medial shaft and the medial shaft may be centered and borne at least partially by a ball part head in a seat of the drive flange or shaft and on the other end of the medial shaft in a rear housing portion. The medial shaft may have a shoulder to bear the rotor axially. An axially moveable control body may be led onto the back end of the rotor for the control of flow of fluid to and from the rotor and seal along the rear end face of the rotor. The rotor has cylinders, which may be straight through bores of equal diameter from end to end and the control body may be pressed by fluid in thrust chambers against the end face of the rotor whereinto the cyliners port and thereby seal the ends of the cylinders relative to areas of other pressure. The intermediate rods may have ball-part configurated ends which bear on part ball formed beds of the pistons or in part ball formed seats in the drive flange. The respective ends of the intermediate rods may be held in the respective seats in the drive flange by a tapered face of a holding ring. The pistons may be free floating pistons which are not connected to the rods, but which are pressed against the respective ends of the rods by high pressure fluid. Thereby the device is able to continue to operate, when one of the pistons sticks, because the end of the respective rod can depart from the associated piston and remains guided in the cylinder by the cylinder's wall.

More in detail, FIG. 1 shows that the front housing 10 bears shaft 43 in bearings 8. Medial housing 11 connects front housing 10 with rear housing 12. Shaft 43 has on its inner end a drive flange 3, with ball-part formed seats for the individual reception of ball-part formed outer heads 15 of intermediate rods 36. Holding ring 19 is fastened to drive flange 3 and holds head 15 in drive flange 3. The inner heads 37 of rods 36 are also ball-part configurated and are borne on beds, which are hollow and also ball-part formed, of pistons 16 or 18. The pistons reciprocate in cylinders 38.

Rotor 13 rotates in housing 11 and contains the cylinders 38. The rear end of rotor 13 forms together with the front face of the the rear control part the control mirror 39 by the tightly sealed rotation of the rotary control face of the rotor along the stationary control face of the rear control part. Inlet ports and outlet ports 32 and 33 are formed in the rear housing 12.

Fluid flows into the cylinders 38 and out thereof periodically, when the device operates. An inclination is provided relative between the drive flange 3 and the axis of the rotor 13, whereby the intermediate rods 36 between the seats in the drive flange 3 and the beds on the pistons 16,18 define the piston stroke in the cylinders 38. The device in this way acts either as a motor when fluid under pressure is led into one of the ports 32,33 or as a pump when one of the ports 32,33 takes in fluid under lower pressure and the other of the ports expels it under higher pressure.

So far the operation of the device is known from the former art and so are the actions and locations of its parts. In the preferred embodiment of the invention the shaft 43 is integral with the rotary drive flange 3. The drive flange 3 has a medial and central hollow ballpart configurated medial seat of a wider radius than common in earlier devices.

Medial shaft 1 is fastened to a central bore in rotor 13. Medial shaft 1 has a front head 21 which is part-ball configurated with a radius substantially equal to the radius of the mentioned medial seat in drive flange 3. Head 21 is borne in the mentioned medial seat and able to swing therein. Shaft 1 has also a rear end 35 which extends beyond the rotor 13 into the rear portion 12 of the device. A medial bore or passage 6 extends through medial shaft 1 but is closed on the rear end of shaft 1 for example by closure 34 or thereby, that the passage 6 does not extend through the rear end of medial shaft 1. A passage 7 leads fluid under pressure into bore or passage 6 and thereby into recess 23 between medial seat and head 21. The passage of fluid under pressure through passage 7 into passage 6 is done either by supply from the outside or by communication of passage 7 to those of ports 32 or 33 which contains the fluid under the higher pressure. Such communication is known from my U.S. Pat. No. 3,793,924 and the communication means of said patent may be associated to passage 7. The known communication is not shown in the Figure of the drawing and passage 7 is shown in part in the drawing. Shaft 1 is seated by fittings 5 in the central bore or hub of rotor 13 and a shoulder of shaft 1 bears on the front end of rotor 13, embracing a portion of the front face of rotor 13. Rotor 13 is pressed by fluid in control ports 29 or 30 towards the shoulder 4 of shaft 1 and medial shaft 1 is pressed by the force onto the shoulder 4 into the medial seat in drive flange 3. In order to obtain this force of pressure in fluid against the rotor 13, the control ports 29 and 30 are respectively so dimensioned, that their cross-sectional area is larger than the cross-sectional area of the rear end face of the rotor 13 adjacent the control ports 29 and 30. In order to assure a smooth slide of head 21 in the medial seat, there may be an annular groove 22 between the medial seat in 3 and the head 21. It may be supplied with high pressure fluid through communication with passage 6 for example by communication 41. Thereby the medial ball-formed portion of the faces of medial seat in drive flange 3 and head 21 of shaft 1 are lubricated from two ends by high pressure fluid. The swinging motion of head 21 in the medial seat in drive flange 3 therefore takes place at smallest friction. The arrangement of the invention described in this paragraph provides the radial and axial guide of the rotor at the rotor's rotation without any further bearings or means. Because the rotor 13 is kept by medial shaft 1 while medial shaft 1 is held on one end on the medial seat of drive flange 3 and on the other end by seating with its cylindrical rear end portion 35 in a cylindrical seat in the rear portion 12 of the device. Ends 15 of intermediate rods 36 swing in the individual beds in drive flange 3. They are kept therein as known in the art by a ring 19. In the former art, however, ring 19 had individual holding faces for each head 15. According to one object of the invention the expensive and delicate machining of such individual holding seats is spared by the application of a common face, for example a slightly tapered annular face 42 of the invention. This face grabs or embraces the rear portions of the heads 15 of rods 36 only in a point, but since there is no load, the retaining of the outer heads 15 in their respective seats in drive flange 3 is enough force to prevent an accidental escape, when there is no pressure in the device. At times of pressure in the device, there is no holding of the heads 15 required, because each cylinder has at all times in operation at least so much pressure in this device, that the pistons 16,18 remain pressed against the rods 36 and the rods 36 remain pressed into their individual seats in drive flange 3 because the device of this invention is not intended to operate mainly as a self-suctioning pump, but operate mainly as a motor or as a pump with pre-pressure in the to-flow ports in a closed cycle.

According to another object of the invention, the holding ring 19 is fastened to drive flange 3 by retaining portions 48 which embrace a rear shoulder of drive flange 3. The embracing may be done by deforming the retainers 48 inwardly after the holding ring 19 is mounted over the drive flange 3. Drive flange 3 and rotor 13 may be provided with coupling means 20, for example gears 20 for the coupling of the drive flange 3 and rotor 13 to revolution in unison.

According to another object of the invention, the pistons 16,18 are free-floating pistons. That means, that the pistons are not connected to the rods 36. On the contrary, the pistons 16,18 could move independently of the intermediate rods 36. This is obtained thereby, that the inner end heads 37 of the intermediate rods 36 are not embraced backwards by holding members or portions of the pistons. Thereby they are free to leave the piston and to depart from the hollow part-ball formed bed of the respective piston 16 or 18. At times of pressure in the respective cylinder 38 behind the piston, the piston is pressed against the inner head 37 of the respective intermediate rod 36 and the inner head 37 of rod 36 center itself by its spherical form into the spherical hollow bed on the adjacent end of the piston. The feature of this object of the invention is, that when a piston 16 or 18 sticks in a cylinder, the rod 36 can move away from the respective piston and the device does not break. The piston will then be forced into the deepest location in the respective cylinder, remain there stuck and come to rest. The respective intermediate rod 36 will then move freely deeper into and partially out of the respective cylinder 38 whereby the outer face of the inner head 37 moves along the inner wall of the respective cylinder, whereby the intermediate rod 36 remains guided by the wall of the cylinder 38 when it has departed from the respective bed of the respective piston 16 or 18. The length of the intermediate rods is so dimensioned that at all locations of the piston stroke or of the rod 36's movement at least one half of the inner head 37 remains within a cylinder 38. When one of the pistons sticks, the motor or pump loses the non-uniformity of flow and a certain non-uniformity of flow appears. However, the motor or pump can continue to work with the rest of the undisturbed and unstuck pistons until the vehicle or machine wherein the device operates can be set to rest. This feature of the invention is especially important in aircraft with vertical propeller axes, like helicopters, or, when the device is used to drive a propeller as fluid motor. The conventional motor of the former art would break, when a piston sticks and the helicopter would then crash. But in case of application of the motor as a helicopter propeller driving fluid motor, the motor may continue to work with one or a few pistons stuck until the helicopter has effected an emergency landing.

Rear housing 12 may have a stationary control face to form a control mirror 39 with the rotary control face of the rotor 13. But instead of being a solid portion, the rear housing 12 may also be formed with inner space(s) to receive a control body 2 as demonstrated in the Figure of the drawing. Control body 2 may have an innermost centric portion 24 to form the stationary control face of control mirror 39. An eccentric medial portion 25 may be located behind the innermost portion 24 and an again centric portion 26 of smaller diameter may be located as end portion behind the medial eccentric portion 25. Thrust chambers 27 and 28 are thereby formed behind the innermost portion 24 and the medial portion 25. The pressure in fluid in these thrustchambers presses the control body 2 with a suitably but not too strong force against the endface of the rotor to close the control mirror 39 there. Control ports 29 and 30 are provided in the innermost portion 24 to control the flow of fluid into and out of the cylinders 38 of the rotor 13. They are communicated to the thrust chambers 27 or 28 respectively and the ports 32,33 are porting into the thrust chambers 28 or 28 respectively. Fluid now flows through a port 32 or 33 into and through a thrust chamber 27 or 28, through innermost portion 24 of control body 2 and through control port 29 or 30 into the respective cyinders 38 and out thereof in the opposite direction. The cross-sectional areas of the thrust chambers 27,28 and of the portions 24,25 on the one end define in combination with the fluid forces in the control mirror 39 on the other end the remaining force which with the stationary control face of portion 24 is pressed against the rotary control face of rotor 13 in the control mirror 39.

The application of control body 2 of the Figure of the drawing is by way of example only. Instead other control bodies may be utilized, such as, for example, those of my U.S. Pat. Nos. 3,831,496; 3,850,201; 3,862,589; 3,889,577; 3,960,060 or thrust pistons and thrust chambers of my U.S. Pat. Nos. 3,398,698; 3,561,328; or 3,697,201. The medial shaft 1 is in the invention commonly extended through the medial bores of the respective control body; for example as shown in the drawing. In case of application of my control body of my U.S. Pat. No. 3,960,060 however, the shaft 1 may have to be extended through a thrust chamber and then have to be sealed in the control body and in the housing portion behind the control body in order to prevent leakage out of the thrust chamber. It is most suitable to bear the rear end of shaft 1 as a cylindrical portion in a fitting diameter of a cylindrical wall in the rear portion of the housing, which means in housing portion 12. In rare cases the rear end of the medial shaft may however also be borne in the respective control body.

The several embodiments described in the specification may be applied either singly or in combination. For example the arrangement of the medial shaft 1 may also be applied in those axial piston devices, which do not employ the free-floating pistons. The pistons may be either of the type of referential number 16 or of the type of referential number 18 of FIG. 1, or of commonly used pistons which bear fastened rod heads within the pistons. The pistons may have spaces 17 for the reception and mounting of flow-through restrictions for example of my co-pending application 765,221 or others or of others of my patents or applications for radial piston devices. Pistons 16 may have their beds deeply inside of the piston, while alternative pistons 16 may have their beds for bearing of the inner heads 37 of rods 36 on the respective ends on the pistons 18. Thus, heads 37 may either lay inside of pistons 16 or on the bed on the end of pistons 18. The free-floating pistons and rods may also be applied in common axial piston devices and so the holding rings 19 or parts thereof. The gist and content of the invention shall therefore be restricted only by the appended claims.

The terms "control-mirror" or "control-fit" in the specification or claims define two complementary faces laying or moving closely on each other.

In a deeper study of the embodiment it will be seen, that there are different places, where members are swinging in respective beds. It is therefore suitable to give those different places respective definitions.

Accordingly, the head 21 of the medial shaft may have a first swing center. The sliding faces thereof are formed by first and second radii. The heads 15 of the intermediate rods 36 may form second swing centers and the sliding faces associated thereto may have third and fourth radii. The inner heads 37 of the intermediate rods 36 may form third swing centers with fifth and sixth radii of the thereto associated sliding faces.

Attention is now directed to an appearance which is discovered by this present continuation in part application.

Looking at FIG. 1, the pistons move axially inwards and outwards in the cylinders of the rotor. Thereby the outer faces of the pistons 16 cause friction along the inner faces of the walls of the cylinders 38. This friction can result in axial thrusts onto the rotor 13. If such axial thrust appears, it will influence the resultant of thrust force of the control body 2 against the rotor 13. The sealing of the control mirror 39 can thereby obtain a negative influence which may result in increased friction or in increased leakage. This present continuation in part will at least partially overcome this problem.

Looking again to FIG. 1 it will be seen that the gear 14 runs in gear 20. This can result in a force of the teeth of the gears onto each other in axial direction relative to the rotor 13. In other words, the inclination of the outer faces of the teeth of gears 14 and 20 can cause a component of forces in axial direction relative to rotor 13 and tend to press the rotor away from the gear 20. Such force again would or could result in increased forces between the faces 39 of the control mirror 39. This present continuation in part application will now attempt to solve this problem or to eliminate it entirely or at least partially.

For these purposes the invention leads a fluid pressure through passage 64 against the rear end of shaft 1,35. This is actually obtained by setting passages 60 and 61 from a respective port or passage 32 or 33 to a respective end of a control cylinder 62, wherein a control piston 63 is axially moveable and moved by the respective pressure either to the right or to the left in cylinder 62. It comes to rest either in the right or in the left end of cylinder 62 and opens the passage 64 whereby it leads the pressure from the respective of the ports or passages 32,33 which has at the respective time the higher pressure in its fluid via the respective portion of cylinder 62 into the passage 64 and thereby against the rear end 35,34 of shaft 1. In the Figure the so obtained communication from port 33 over passage 60 and through the right portion of control cylinder 62 to the passage 64 and thereby against the rear end of the shaft 1 is illustrated.

By this arrangement of the present invention a thrust against the rear end of the shaft 1 is created and maintained as long as the device operates under pressure in the fluid. This force is counter directed relative to the mentioned resulting actions of friction of pistons in the cylinders and of thrust components between the gears 14 and 20. The size of the diameter of the rear end of the shaft 1 defines together with the pressure in the respective port or passage 32 or 33 the value of the created thrust force in the direction against the rear end of the shaft 1 and the described problems are thereby eliminated, reduced or partially overcome. This force of the present invention can become dimensioned as desired and take over the thrust of the shaft 1 into its seat face 50 in shaft 43. The control body 2 can then become best dimensioned to effect only the single function of sealing the flow of fluid into and out of the cylinders 38 of rotor 13.

FIG. 2 illustrates similar effects as those which are obtained in FIG. 1, but FIG. 2 obtains at the same time the most simple and inexpensive pump or motor of the invention.

The rotor 79 is revolvably borne in bearings 68 and 69 of housing 65 with cover 165. The bearings are radial bearings, while bearings 68 are at the same time also axial bearings. The ports 92 and 93 supply or let out fluid to and from the cylinders 80 of the rotor via the control ports of control body 70. The nonrevolving (stationary) control face is 103, while the rotary control face is shown by 104. Pistons 81 reciprocate in cylinders 80 and carry on their front heads 82 the thereon pivotable piston shoes 8 which slide on the piston stroke guide face 84 of piston strike guide body 85. The piston stroke guide face 84 is inclined relative to the axis of the shaft and the piston stroke guide body 85 is borne axially with its rear end in the housing, while pin 99 prevents its rotation.

Figure 3:
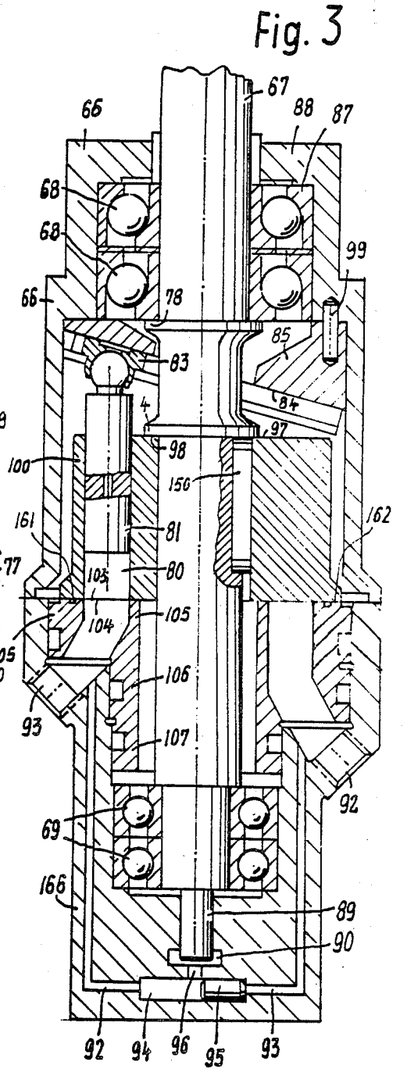
FIG. 3 is a longitudinal sectional view through still another embodiment of the invention.

In FIG. 3 the respective members are housing 66, cover 166 and control body 105, while the other mentioned members have equal referential numbers in FIGS. 2 and 3, but the rotor in FIG. 2 is 79 while in FIG. 3 it is shown by referential 100. The mentioned members with equal referential numerals have similar sizes and functions in both Figures. The rotor of FIG. 2 is separately illustrated in FIG. 6, while the rotor of FIG. 1 is separately shown in FIG. 7 with the shaft and rotor formed by a single piece.

In FIG. 2 the rotor 79 is an integral one piece with the shaft 67. Both FIGS. 2 and 3 have only a single shaft and the shaft has a single and straight axis. Thereby these devices are rather simple pumps or motors for easy and inexpensive manufacturing.

In both Figrues a rear thrust chamber 90 may be provided to press against the rear end of the respective shaft.

In both Figures the shaft is rearwardly borne in bearings 69 whereby the shaft is prevented from movement to the rear. In axial direction forwards to the front the shafts are borne in axial and radial bearing(s) 68. Thus, any axial forward thrust against the respective shaft is borne by portion 87 of bearing 68 in portion 88 of the respective housing 65 or 66. The cylinders 80 are again straight through cylinders for the prevention of acceleration and internal compression losses in fluid as it is explained at hand of FIG. 1 as a main portion of the present invention. Consequently, the ports in the control bodies have respective fitting and aligned dimensions and locations to fit to the straight through cylinders.

In FIG. 2 the control body 70 is for one directional flow while control body 105 in FIG. 3 is for reversible directional flow and thereby for two directional flows. Consequently the control body of FIG. 2 has only one concentric front portion 70 and one eccentric rear portion 74 while the control body of FIG. 3 has one concentric front portion 105, an eccentric medial portion 106 and a rear portion 107. The fluid on the rear of the respective shoulder formed between neighboring portions presses the stationary control face 103 of the control body into sealing engagement with the rotary rear face 104 of the respective rotor. It is known from the inventor's patents, how to calculate and design the respective control bodies for a proper sealing with lowest possible friction between control faces 103 and 104.

A novel invention is the ring 71,160 in FIG. 2. Is has a double function. Its first function is to center by its outer face 75 the rear cover 165 to the front housing 65. Thereby a seal ring seat 77 may be formed. Its second function is to seal the outer face 73 of the front portion 70 of the control body relative to its eccentric portion 74 by seal ring bed 163. A further recess 76 may be provided in ring 160 if so desired.

A further novelty of the invention resides in the control body-rotor arrangement of FIG. 3. There the sealing portion of the control faces 103,104 is radially ended by a circular recess 161 and radially outwards of the recess 161 the support land 162 is formed. The rotor obtains on its rear end a respective radially outwards directed thickening. The stability of the running of the rotary control face on the stationary control face is thereby improved.

An important novelty of the present invention is that the respective shaft 67 has a flange 78 which extends radially outwards from the shaft 67 to bear with this flange 78 on the rear inner end of bearing 68 or of the rear bearing of bearings 68. By this flange the axially forwardly directed thrust of the shaft is borne via the bearing(s) 68 on the portion 88 of the respective housing 65,66. Axial dislocations of the shaft or shaft and rotor are thereby prevented by simple means and the pistons are free to move axially in their respective cylinders of the respective rotor.

In FIG. 3 the shaft has a second radially exending flange with an end face 98 to bear thereon the frontwards end face 97 of the rotor 100. With these faces 97 and 98 the rotor 100 is prevented from forward movement relative to the shaft 67. The key 150 serves to prevent rotation of the rotor 100 relative to the shaft 67.

In FIG. 2 the passage 91 communicates the rear thrust chamber 90 to the high pressure port 93. Note that the diameter of the rear end 89 of the shaft defines the cross sectional area with which the shaft shall become pressed against the front holder 88 of the housing. In FIG. 3 the control piston 95 is moveable in cylinder 94 similar as in FIG. 1. One end of control cylinder 94 is communicated by passage 192 to port 93 while the other end of it is communicated by passage 193 to port 92. The medial portion of control cylinder 94 is communicated by passage 96 to the thrust chamber 90 on the rear of shaft end 89. The respective port which carries at the respective time the higher pressure moves the control piston 95 to the right or left to communicate at the respective time either passage 192 or 193 to passage 64.

Figure 6:
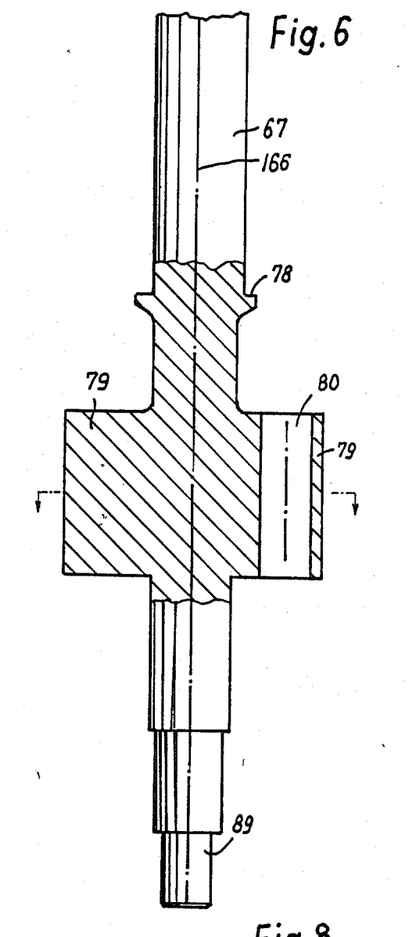
FIG. 6 is a longitudinal sectional view through a rotor of the invention.
Figure 8:
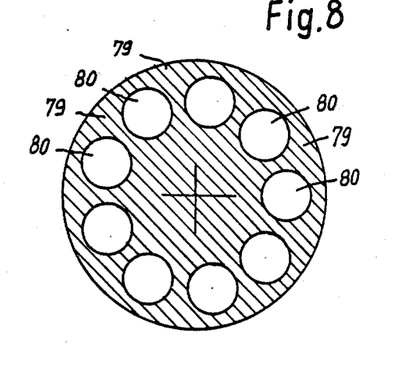
FIG. 8 is a longitudinal sectional view through a rotor of the invention.

In FIG. 6 the integral shaft 67 with rotor 79 is separately illustrated in a longitudinal sectional view. This is the integral one piece rotor - shaft of FIG. 2. FIG. 8 is the cross sectional view along the arrowed line of FIG. 6 through FIG. 6. In FIG. 8 one sees the cylinders 80 in the rotor 79. In this separated illustration in FIGS. 6 and 8 it is clearly seen that the cylinders 80 are straight through bores of equal diameter over their entire lengths. Important further is in FIG. 6 that the shaft and rotor have a common straight axis 166, the shoulder 78 for attachment against the bearings 68 and the rotary control face 104.

Figure 7:
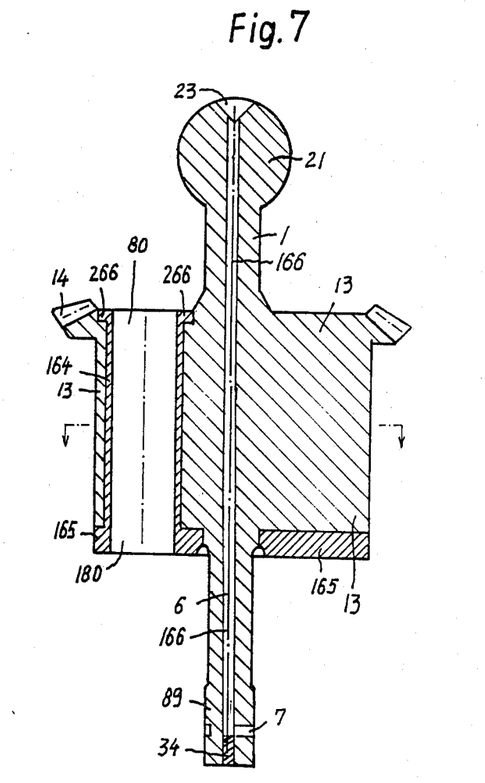
FIG. 7 is a cross sectional view through FIG. 6 along its arrowed line.
Figure 9:
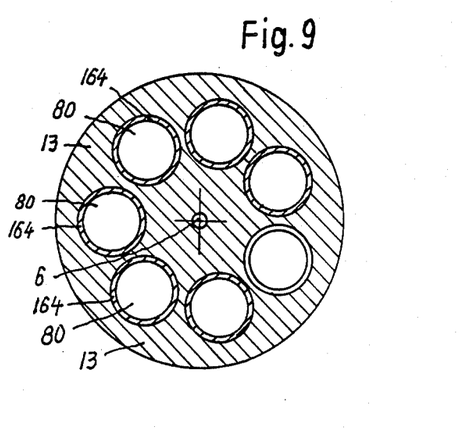
FIG. 9 is a cross sectional view through FIG. 8 along the arrowed line of FIG. 8.

FIG. 7 illustrates that the rotor 13 and medial shaft 1 of FIG. 1 can be made integral by a single one piece body. Accordingly this single body is shown in a longitudinal sectional view in FIG. 7 and its cross sectional view along the arrowed line in and through FIG. 7 is shown in FIG. 9. This one piece body now has the rotor portion 13, the shaft portions 1 and 89 and the front head portion 21 with fluid pressure pocket 23. Seen here is also the gear 14. The novelty of the invention in this continuation in part application is the one piece body which combines the shaft and the rotor in a single piece of material. As a further feature it is shown that the body may be made of steel while bushes of suitable material, for example, bronze, may be inserted or as shown in the Figure, be casted into the bored one piece body. The Figure shows bores of bigger diameter whereinto the bushes 164 are casted to form the cylinders 80, the holding flanges 266 on the front end of the rotor portion and the rear slide portion 165 over the entire rear end of the rotor portion with the rotary control face 104 formed on the rear end of the rotor portion. The pasasge 6 and the axis 166 are also shown and so is the closure block 34 and the passage 7 in the rear end portion 89. These means are known from FIG. 1. In FIG. 9 the straight through cylinders 80 are seen and so are the bushes 164 in cross sectional views.

Note that the rotors of these Figures can be casted or forged for their basic structures.

Figure 4:
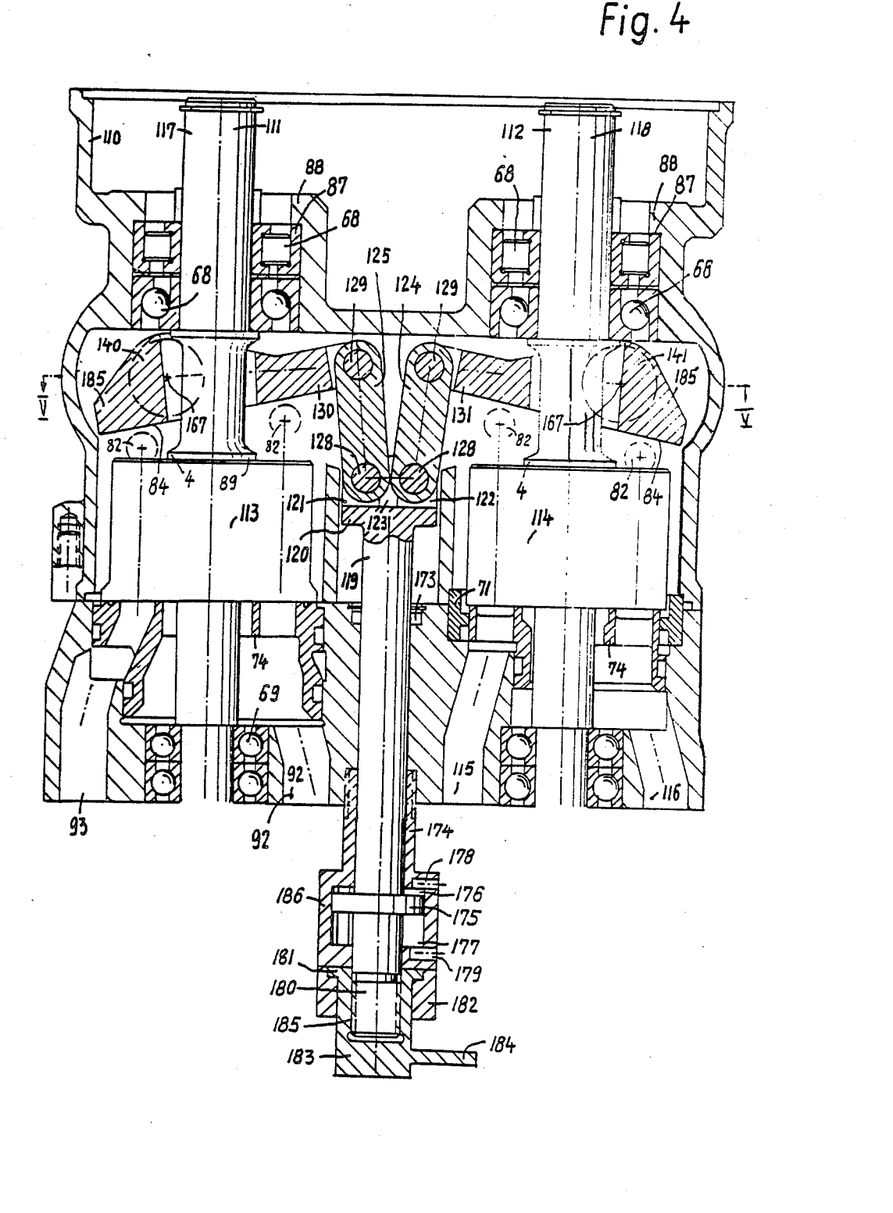
FIG. 4 is a longitudinal sectional view through a device of the invention.
Figure 5:
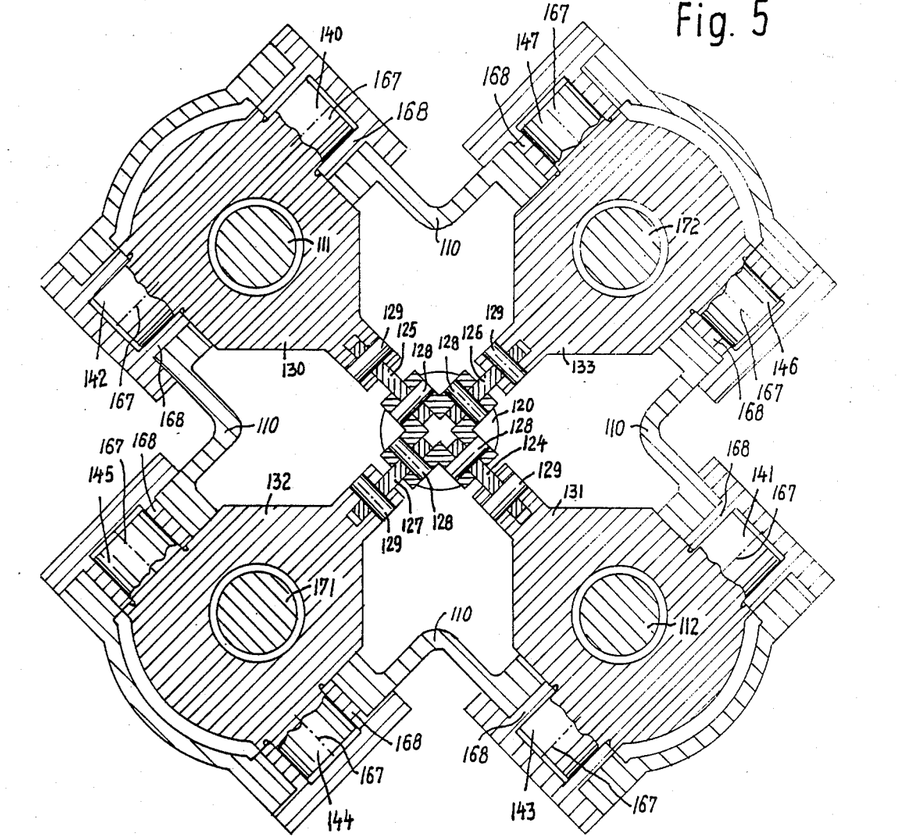
FIG. 5 is a cross-sectional view through FIG. 4 along the arrowed line of FIG. 4.

FIG. 4 with its cross sectional FIG. 5 illustrate a further important arrangement of the invention. In these Figures, four pumps (or motors) of FIGS. 2 or 3 are mounted into a common housing 110. The shafts and rotors with cylinders and pistons are provided as in FIGS. 2 or 3. The piston stroke guide bodies 85 of FIGS. 2 and 3 are, however, replaced by the variable piston stroke guide bodies 130,131,132,133 with piston stroke guide faces 84 as in FIGS. 2 and 3. The mentioned piston stroke guide bodies 130 to 133 are pivotable around their respective axes 167. As seen in FIG. 5, the guide bodies 130 to 133 have lateral bearing portions 140 to 147 which are pivotably borne in respective bearing beds in the common housing 110. Bearing sleeves and/or covers 168 may be provided around the bearing portions 140 to 147, respectively.

The invention obtained in FIG. 4 and 5 is a means to synchronize the four pumps of these Figures to equal quantities of delivery of flows of fluid. Instead of providing 4 pumps, it may be 2, 3 or any other desired number of a plurality of pumps or motors in a common housing. In power shovel pumps of the former art the delivery quantities of plural pumps when roughly synchronized by imprecise means and controllers of complicated and expensive design and structure. The present invention overcomes these difficulties of the former art by equalizing or proportionalizing the plural flows exactly and with simple and reliable control means. The equalization of the flows is obtained by a combination of equally sized pumps, equally sized control connectors, a common controller and equally sized and geared means on the shafts 111,112,171 and 172. In FIG. 4 two of the shafts, namely 111 and 112 are shown and the portions 117,118 are the shaft portions which hold equally sized gears on the shafts. The ports of these two visible pumps are shown by 92,93,115 and 116.

The piston stroke guide bodies 130 to 133 have forwardly extended fingers 130 to 133 with eyes wherethrough pins 129 are extended to hold in the eyes of the fingers pivotably the connecting bars 124 to 127, respectively. Each of the connecting bars engages a respective seat in the controller head 120 of a common controller head and is kept pivotably in the respective seat by a pin 128. The mentioned beds are formed by slots 121,122,123, in the common controller head 120. From the controller head 120 the controller shaft 119 extends through a guide bore in the common housing 110, sealed by a seal ring 173. On the rear end of the common housing the adjustment arrangement is assembled or can be assembled. In FIG. 4 it is shown by a control fluid flow operated adjustment device and by a hand operated adjustment device. While examples of both are shown in the Figure, commonly only one of them is mounted or they are separable from each other. In the Figure the adjustment housing 174 is mounted to the common main housing 110. It has a cylinder with a therein reciprocable piston 175 of controller shaft 119. Ports 178 and 179 lead alternatively control fluid into one end 176 or 177 of controller cylinder 186 whereby the controller piston 119 is moved up and down in FIG. 4 to vary the angle of inclination of the piston stroke guide bodies and of their piston stroke guide faces 84 to vary the piston strokes of all four pumps exactly equally and in unison. Instead of operating the control piston 175 by pressure in a control fluid flow, the handle 184 may be pivoted or revolved to move the controller piston 119 up and down by the threading 185 in control nut 183 and on the rear end of the controller shaft 119. Control nut 183 is held by flange 181 in controller housing portion 182.

Figure 10:
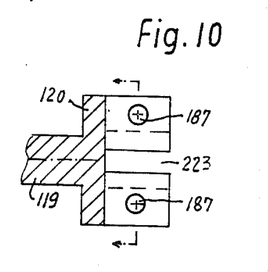
FIG. 10 is a longitudinal sectional view through a controller head of the invention.

FIG. 10 shows a longitudinal sectional view through the controller head 120 with a portion of the controller shaft 119. In this Figure the axis is horizontally laid while in FIG. 4 it is vertically provided. FIG. 10 is thereby a sectional view through FIG. 11, along the arrowed line in FIG. 11.

Figure 11:
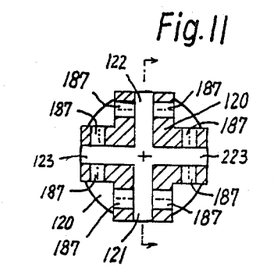
FIG. 11 is a cross sectional view through FIG. 10 along the arrowed line of FIG. 10.

FIG. 11 is a cross sectional view through FIG. 10 along the arrowed line in FIG. 10. FIGS. 10 and 11 are given in order to see the slots 121,122,123 and 223 whereinto the connecting bars 124 to 127 are assembled, respectively. Shown are also the bores 187 into which the pins 128 are set to hold pivotably the connecting bars 124 to 127. One sees here that the head 120 is cross wise slotted to form the recesses 121,122,123 and 223. The slots and bores shall correspond to the number of pumps or motors which are provided in the common housing 110. Since in FIG. 5 four of such pumps are asesmbled, there are, consequently, four of such slots and bores for four pins 128.

Note that the combination of the invention demands that the pumps must be run with equal speeds and have equal dimensions of their parts to obtain the exact equalness of delivery volumes at equal times. Thus, the equal gears on the shafts and the assembly of them in a common housing together with the assembly of the adjustment arrangements in the common housing 110 obtain and secure the accurate equalness of separated flows at equal times.

A specific feature of the invention is also that the pumps are of low weight and obtain a high output of power in a small size while equalness or proportionateness of individual output flows is secured. The four flow pump arrangement of the invention which is shown for variable pumps but which can also be made with constant stroke pumps as such of FIGS. 1 to 3, can be used to equalize the rotary velocities of plural propellers in vertical take off aircraft and helicopters. The pumps of FIGS. 4,5 fit to the ultra power engine of the inventor's patent application(s). A common gear is then set onto the outgoing shaft of the engine to mesh into the four gears on the portions 117,118 of the shafts 111,112 etc..

Since the invention is still more described in the appended claims, the claims are considered to form a portion of the description of the preferred embodiments of the invention.

In FIG. 2 it may be noted that the eccentric portion 74 extends partially radially outwards beyond the outer diameter of the concentric portion 70 and beyond the inner face 73 of the centering ring 71,160. This is required in order to obtain equal radial distances of the pressure centers in the control faces and in the thrust chamber between portions 70 and 74 of the control body 70. Note also that recesses are provided in the housing 65 and in the cover 165 to sandwich the ring 76,160 between the mentioned housing and cover in order to prevent axial movement of the centering ring and to fix its axial and radial location relative to the mentioned housing and cover and thereby also relative to the control body.

What is claimed, is:

1. A fluid handling device, like a pump or motor, comprising, in combination :
  a housing with a therein revolvable rotor which is provided with substantially axially extending cylinders to locate therein reciprocable pistons, a piston stroke guide face provided on a piston stroke guide body in a front portion of said housing for guiding on said piston stroke guide face piston shoes which are pivotably provided on the heads of said pistons, a rotary control face on a rear portion of said rotor, a non-revolving control face on a control body to seal along said rotary control face, entrance ports and outlet ports communicated to respective individually with inflow and outflow control ports in said control body and in said non-revolving control face whereby one of said spaces is a high pressure space to form a thrust chamber to thrust the control body and thereby said non-revolving control face against said rotary control face to seal the flow of fluid into and out of said cylinders of said rotor, wherein an improvement is provided, and;
  wherein said improvement is a straight through longitudinal shaft, and a holding means in said front portion of said housing to provide an axial holding of said shaft in combination with a thrust arrangement on a rear end portion of said shaft to press said shaft against said holding means, in combination with the sealing of said control body in a portion of said housing exclusively by cylindrical faces.

2. The device of claim 1, wherein a radially extending shoulder is provided on said shaft to bear against an axial bearing which is provided in said housing and thus service as said holding means.

3. The arrangement of claim 1 wherein said thrust arrangement is also provided by said one of said spaces rearward of a portion of said control body.

4. The device of claim 1, wherein said thrust arrangement is provided by a rearward extending portion of small diameters of said shaft and by a chamber into which said rearward extending portion sealingly enters with fluid under pressure supplied into said chamber.

5. The device of claim 6, wherein a passage is set from a high pressure port to said chamber to supply said chamber with a fluid and pressure in said fluid equal to said high pressure in said high pressure port.

6. The device of claim 1, wherein said control faces extend radially to a circular groove which is communicated to the pressure - free interior of said housing while radially outwards of said groove bearing lands are provided by radial extensions of said control faces .

7. The device of claim 1, wherein said shaft is proivided with two radially extending flanges, wherein one flange bears axially said rotor while the other of said two flanges bears axially in the opposite direction against an axial bearing which is provided in said housing and thus serves as said holding means.

8. A fluid handling device, like a pump or motor, comprising, in combination :
a housing with a therein revolvable rotor which is provided with substantially axially extending cylinders to locate therein reciprocable pistons, a piston stroke guide face provided on a piston stroke guide body in a front portion of said housing for guiding on said piston stroke guide face piston shoes which are pivotably provided on the heads of said pistons, a rotary control face on a rear portion of said rotor, a non-revolving control face on a control body to seal along said rotary control face, entrance ports and outlet ports communicated to respective spaces on a rear portion of said control body to communicate individually with inflow and outflow control ports in said control body and in said non-revolving control face whereby one of said spaces is a high pressure space to form a thrust chamber to thrust the control body and thereby said non-revolving control face against said rotary control face to seal the flow of fluid into and out of said cylinders of said rotor, wherein an improvement is provided, wherein said improvement is a straight through longitudinal shaft, and a holding means in said front portion of said housing to provide an axial holding of said shaft in combination with a thrust arrangement on a rear end portion of said shaft to press said shaft against said holding means, wherein said thrust arrangement is provided by a rearward extending portion of small diameter of said shaft and by a chamber into which said rearward extending portion sealingly enters with fluid under pressure supplied into said chamber, and;

wherein a control cylinder with a therein reciprocable control piston is associated with said chamber, a passage is set from the middle of said control cylinder to said chamber while passages are provided from the ends of said control cylinder to the entrance and outlet ports of said device in order to supply pressure from said ports to the ends of said chamber, whereby the respective higher pressure of the respective port presses said control piston into the opposite location to open the communication of the port which is under higher pressure to said passage from the middle of said control cylinder to said chamber.

* * * * *